(12) United States Patent
Hilberer

(10) Patent No.: US 8,021,465 B2
(45) Date of Patent: *Sep. 20, 2011

(54) COMPRESSED AIR SUPPLY DEVICE

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 251 days.

This patent is subject to a terminal disclaimer.

(21) Appl. No.: 12/366,330

(22) Filed: Feb. 5, 2009

(65) Prior Publication Data

US 2009/0199523 A1 Aug. 13, 2009

Related U.S. Application Data

(63) Continuation of application No. PCT/EP2007/007025, filed on Aug. 8, 2007.

(30) Foreign Application Priority Data

Aug. 8, 2006 (DE) .......................... 10 2006 037 311

(51) Int. Cl.
  *B01D 53/02* (2006.01)
  *B60T 17/00* (2006.01)
(52) U.S. Cl. .................. 95/117; 96/147; 55/DIG. 17
(58) Field of Classification Search .............. 96/108, 96/147; 95/117; 55/515, DIG. 17; 34/80, 34/472, 473; 210/DIG. 17
  See application file for complete search history.

(56) References Cited

U.S. PATENT DOCUMENTS

| | | | | |
|---|---|---|---|---|
| 2,377,740 A | | 6/1945 | Alford et al. | |
| 2,675,886 A | * | 4/1954 | McMullen | 55/507 |
| 4,052,307 A | * | 10/1977 | Humbert, Jr. | 210/130 |
| 4,719,012 A | * | 1/1988 | Groezinger et al. | 210/232 |
| 4,816,047 A | * | 3/1989 | Neal | 96/137 |
| 4,946,485 A | * | 8/1990 | Larsson | 96/152 |
| 4,948,505 A | * | 8/1990 | Petrucci et al. | 210/238 |
| 5,110,327 A | * | 5/1992 | Smith | 96/113 |
| 5,595,588 A | | 1/1997 | Blevins | |
| 5,762,671 A | * | 6/1998 | Farrow et al. | 55/496 |
| 5,792,245 A | * | 8/1998 | Unger et al. | 96/137 |
| 5,876,600 A | * | 3/1999 | Matsubara et al. | 210/443 |
| 6,193,884 B1 | * | 2/2001 | Magnusson et al. | 210/235 |
| 6,440,188 B1 | * | 8/2002 | Clements et al. | 55/378 |
| 6,558,457 B1 | * | 5/2003 | Kolczyk | 96/134 |
| 7,294,161 B2 | * | 11/2007 | Connor et al. | 55/498 |
| 2001/0037969 A1 | * | 11/2001 | Stankowski | 210/348 |

(Continued)

FOREIGN PATENT DOCUMENTS

DE 1455763 2/1969

(Continued)

OTHER PUBLICATIONS

International Search Report of International application No. PCT/EP2007/007025 dated Dec. 13, 2007 with English translation (six (6) pages).

(Continued)

*Primary Examiner* — Frank Lawrence, Jr.
(74) *Attorney, Agent, or Firm* — Crowell & Moring LLP

(57) ABSTRACT

A compressed air supply device for a commercial vehicle is provided. The compressed air supply device includes a valve housing and an air-drying cartridge connected releasably to the valve housing. The valve housing and the air-drying cartridge are connected to each other via a bayonet fastening arrangement.

17 Claims, 14 Drawing Sheets

U.S. PATENT DOCUMENTS

| | | |
|---|---|---|
| 2004/0094036 A1 | 5/2004 | Nichols et al. |
| 2005/0178714 A1 | 8/2005 | Stockbower |
| 2009/0199522 A1* | 8/2009 | Hilberer .................. 55/385.1 |

FOREIGN PATENT DOCUMENTS

| | | |
|---|---|---|
| DE | 1950699 | 4/1971 |
| DE | 3789714 T2 | 8/1994 |
| DE | 19827566 A1 | 1/1999 |
| DE | 19911933 A1 | 9/1999 |
| DE | 19935810 A1 | 3/2000 |
| DE | 19955898 A1 | 5/2001 |
| EP | 0 234 229 A2 | 9/1987 |
| EP | 0 608 606 A1 | 8/1994 |
| EP | 1213472 A1 | 6/2002 |
| GB | 785310 | 10/1957 |
| JP | 09088829 A | 3/1997 |
| WO | WO 2005/051521 A1 | 6/2005 |

OTHER PUBLICATIONS

International Search Report of International application No. PCT/EP2007/007026 dated Dec. 13, 2007 with English translation (six (6) pages).

Chinese Office Action dated Dec. 31, 2010 with English translation (seven (7) pages).

European Communication mailed Feb. 22, 2011.

* cited by examiner

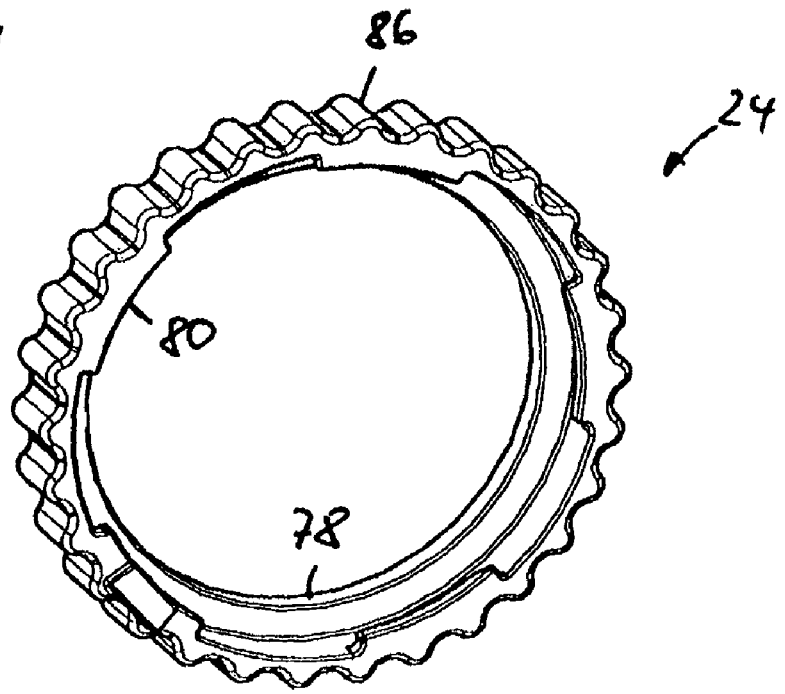
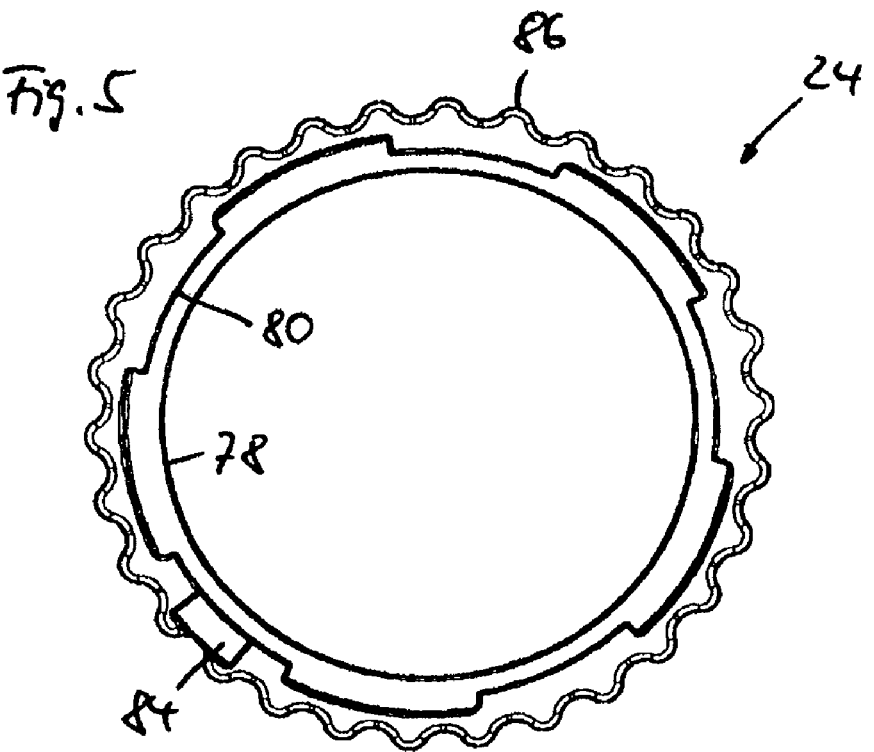

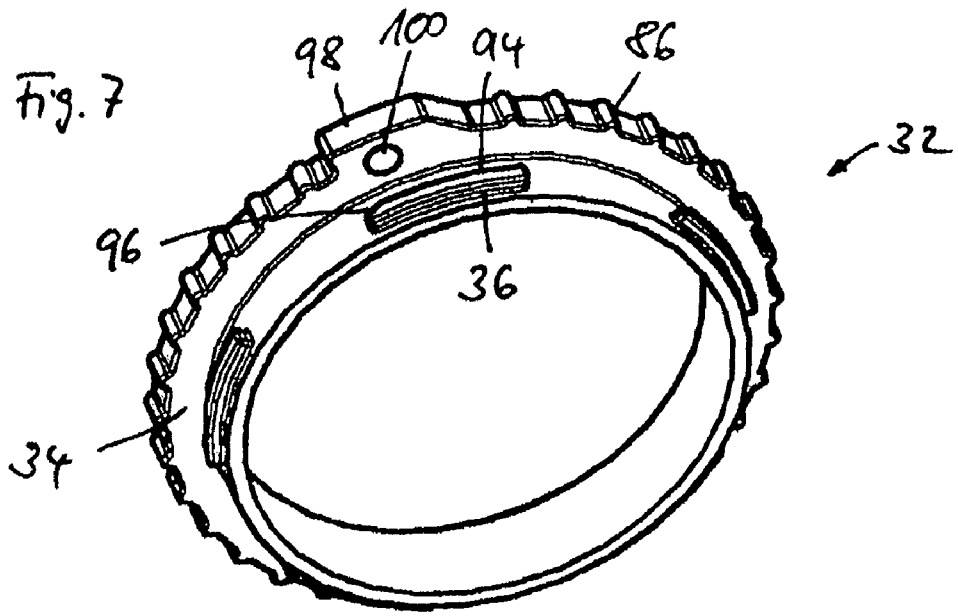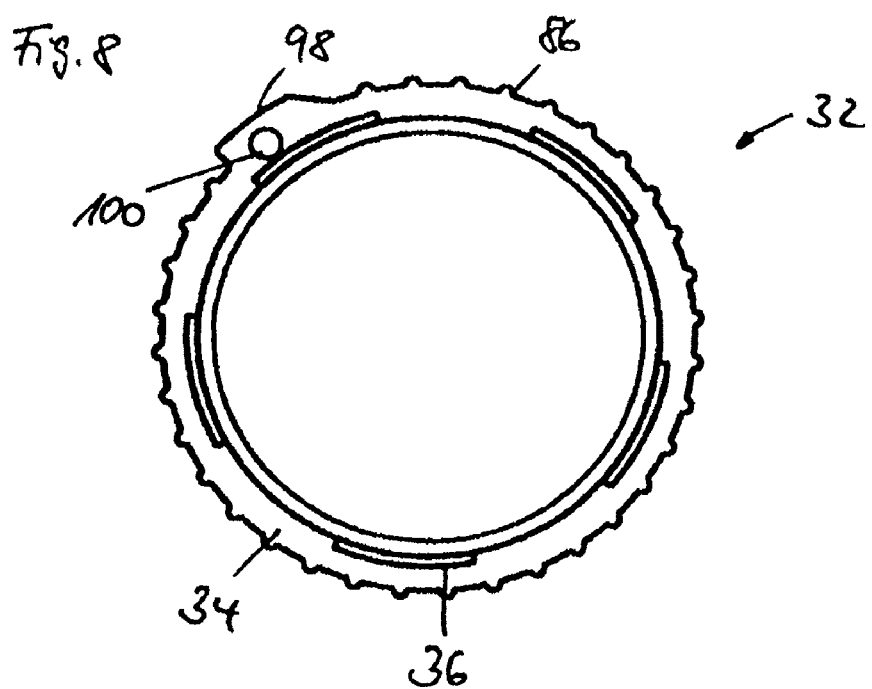

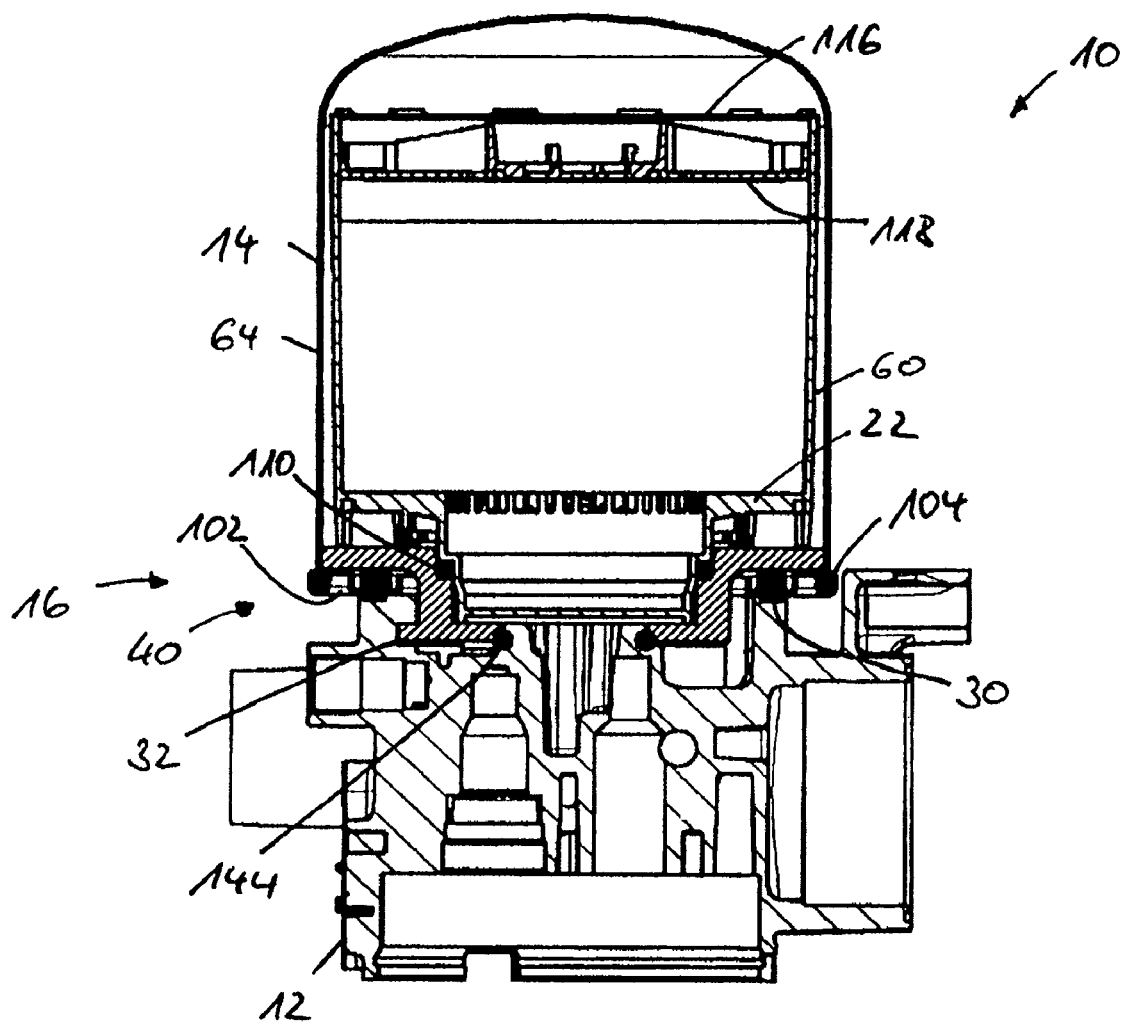

COMPRESSED AIR SUPPLY DEVICE

CROSS-REFERENCE TO RELATED APPLICATIONS

This application is a continuation of International Application No. PCT/EP2007/007025, filed Aug. 8, 2007, and claims priority under 35 U.S.C. §119 to German Patent Application No. DE 10 2006 037 311.1, filed Aug. 8, 2006, the entire disclosures of which are herein expressly incorporated by reference.

This application contains subject matter related to U.S. application Ser. No. 12/366,307, entitled "Compressed Air Supply Device," filed on even date herewith.

BACKGROUND AND SUMMARY OF THE INVENTION

The invention relates to a compressed air supply device for a utility vehicle, having a valve housing and having an air dryer cartridge which is releasably connected to the valve housing.

Compressed air supply devices of said type provide treated compressed air to compressed air consumers in utility vehicles. Typical compressed air consumers are for example a pneumatic brake system or an air suspension system. A compressed air supply device combines numerous functions. One important task is that of drying and cleaning the air. For this purpose, an air dryer cartridge is provided which contains filter devices and a drying agent. Other important tasks are those of regulating the pressure of the compressed air provided by a compressor and reliably distributing the compressed air between the different consumer circuits. Said tasks are performed by valve devices which are accommodated in a valve housing, specifically a pressure regulator and a multi-circuit protection valve. Modern compressed air supply devices comprise, in addition to the pneumatic components, an electronic controller and electrically actuable components, for example solenoid valves, and a sensor arrangement which is connected to the electronic controller. The compressed air supply devices which are equipped in this way are also referred to as EAC (Electronic Air Control) systems.

Since the absorption capacity of the air dryer cartridge for foreign substances and humidity is limited, said air dryer cartridge must be regenerated, and ultimately exchanged, at regular intervals and as a function of the delivery capacity of the compressor. It should expediently be possible for the servicing process of exchanging the air dryer cartridge to be carried out by the driver of the utility vehicle himself, that is to say without the aid of a workshop. Consequently, the air dryer cartridges are attached to the valve housing at an easily accessible location by means of a multi-start thread. If it is necessary for the driver of the utility vehicle to exchange the air dryer cartridge, then it is merely necessary here for the cartridge to be unscrewed, wherein during the unscrewing process, the residual pressure present in the compressed air system can escape without any problems. The new air dryer cartridge can then be connected to the valve housing by the thread.

One problem of the connection type by a thread is that the driver of the utility vehicle must have a sense of how tightly the air dryer cartridge should be screwed to the valve housing. Here, he may be assisted by means of a tool which is to be carried on-board and which always ensures correct assembly, wherein the carrying of the tool however then constitutes additional expenditure. Furthermore, a certain additional assembly height is required for the threaded connection, which counteracts the general desire to reduce the installation space of vehicle components.

The object on which the invention is based is that of providing a compressed air supply device which, while having a low assembly height, permits fault-free and reliable assembly of the air dryer cartridge, wherein in particular, no tools should be necessary.

The invention builds on the generic compressed air supply device in that the valve housing and the air dryer cartridge are connected to one another by means of a bayonet connection. A bayonet connection offers the advantage of an assembly height which is reduced in relation to that of a threaded connection, and the assembly of the air dryer cartridge is simplified in relation to the conventional assembly by means of a thread.

According to one preferred embodiment, it is provided that the air dryer cartridge and the valve housing have, at least in sections, in each case one substantially radially outwardly extending collar, with sections being formed by at least one of said collars, which sections have an axial collar thickness which increases in the closing direction of the bayonet connection, and in that an outer bayonet ring which is guided by means of the collars and which can be released from the air dryer cartridge and the valve housing is provided, which outer bayonet ring has a radially inwardly extending collar and, offset in the axial direction with respect thereto, inwardly directed projections, with the axial width of the projections being matched to the variable axial collar thickness in such a way that the bayonet connection can be closed or released by means of a relative rotation of the outer bayonet ring and the valve housing or air dryer cartridge respectively. An outer bayonet ring is expedient as a connecting element if the valve housing and the air dryer cartridge should have substantially the same radial dimensions.

It is expediently provided that the collar of the valve housing has a plurality of collar sections which extend in the tangential direction and which have an axial collar thickness which increases in the closing direction of the bayonet connection and recesses which are provided between said collar sections, and in that the collar of the air dryer cartridge extends substantially uniformly over the entire periphery and, when the bayonet connection is closed, interacts by means of a seal with the valve housing. The comparatively thin-walled air dryer cartridge therefore need not have any special design in the region of its collar, while the bevels required for realizing the bayonet connection are realized in the region of the valve housing.

It is preferable if the collar sections at least partially have a stop for limiting the closing rotation of the bayonet connection. As a result of the stop, there is no longer any doubt for the driver, when placing on a new air dryer cartridge, that assembly has been carried out correctly.

Furthermore, it can expediently be provided that the outer bayonet ring is rotationally secured with respect to the air dryer cartridge. Rotation of the air dryer cartridge in the sealed state via the sealing surface is thereby prevented.

According to a further preferred embodiment of the present invention, it is provided that the air dryer cartridge has a substantially radially outwardly extending collar which, in the closed state of the bayonet connection, can be acted on with a force in the axial direction by means of an inner bayonet ring which surrounds the air dryer cartridge, in that the inner bayonet ring has a radially outwardly extending collar and, offset in the axial direction with respect thereto, outwardly directed projections which have an axial projection thickness which increases in the closing direction of the bayonet connection, and in that a part, which is situated at least partially radially outside the inner bayonet ring, of the valve housing has radially outwardly extending recesses whose axial thicknesses are adapted to the projections of the valve housing in such a way that the bayonet connection can be closed or released by a relative rotation of the inner bayonet ring and the valve housing. The use of an inner bayonet ring is expedient if the valve housing has a larger radius than the air dryer cartridge. The inner bayonet ring is then inserted into the valve housing without taking up further installation space.

As already provided in the case of the outer bayonet ring, it is provided that the projections of the inner bayonet ring at least partially have a stop for limiting the closing rotation of the bayonet connection.

It may likewise be provided that the inner bayonet ring is rotationally secured with respect to the air dryer cartridge.

According to one preferred embodiment of the invention, it is provided that the inner bayonet ring can be released from the air dryer cartridge. This corresponds to the principle which is likewise realized in connection with the outer bayonet, in which the bayonet ring, as an additional component, generates the connection of the air dryer cartridge and valve housing.

Here, it may expediently be provided that the air dryer cartridge interacts with the valve housing via a seal when the bayonet connection is closed. In the case of a direct sealing connection of the air dryer cartridge and valve housing, this may be referred to as an open design of the air dryer cartridge, which is particularly expedient with regard to a reduction in structural height.

According to a further embodiment, it may however also be provided that the inner bayonet ring is fixedly connected to the air dryer cartridge and forms at least a part of a foot flange of the air dryer cartridge. A closed system of said type is advantageous in particular with regard to assembly, since only two components are involved.

According to a further particularly preferred embodiment of the compressed air supply device according to the invention, it is provided that the bayonet connection has a bayonet ring which has an opening which holds a securing element, with the securing element latching, in the closed state of the bayonet connection, into an opening of the valve housing, via which opening the compressed air supply device can be ventilated by means of an actuation of the securing element. In addition to the stops which are preferably provided in the bayonet connection and which limit the rotation of the bayonet connection, a latching securing element can offer additional security. The latching can be audibly perceived by the driver. Furthermore, the securing element makes it possible for the compressed air supply device to be ventilated before the opening of the bayonet connection. This is expedient in the case of a connection by a bayonet connection since, otherwise, an abrupt ventilation could take place after a slight opening movement of the bayonet connection, which could sometimes lead to dangerous situations. Since the securing element latches in the closed state of the bayonet connection and thereby prevents the opening movement, it is ensured that a ventilation must always take place, by the actuation of the securing element, before the opening process.

This is realized in structural terms in that the securing element has a lug which is pressed by the force of a spring into the opening of the valve housing, with the lug being movable counter to the spring force in order to ventilate the compressed air supply device and in order to enable the opening movement of the bayonet connection.

It may also be provided that the valve housing has an eccentric pin which projects in the direction of the air dryer cartridge and which protrudes into an opening of a drying agent box which is arranged in a housing of the air dryer cartridge, with the length of the pin being dimensioned such that the first contact between the air dryer cartridge and the valve housing during assembly takes place by said pin. The centering aid and rotational locking provided in this way are first made possible by means of the connection of the valve housing and air dryer cartridge by a bayonet connection, since in the case of a connection with a multi-start thread, a rotation of the air dryer cartridge and valve housing relative to one another is necessary.

The invention also relates to a valve housing for a compressed air supply device according to the invention.

Other objects, advantages and novel features of the present invention will become apparent from the following detailed description when considered in conjunction with the accompanying drawings.

BRIEF DESCRIPTION OF THE DRAWINGS

FIG. 4 shows a perspective illustration of an outer bayonet ring according to an embodiment of the invention;

FIG. 5 shows a plan view of an outer bayonet ring of the FIG. 4 embodiment;

FIG. 7 shows a perspective illustration of an inner bayonet ring according to another embodiment of the invention;

FIG. 8 shows a plan view of an inner bayonet ring of the FIG. 7 embodiment;

FIG. 9 shows a third embodiment of a compressed air supply device according to an embodiment of the invention, in a sectioned illustration;

DETAILED DESCRIPTION OF THE DRAWINGS

In the following description of the drawings, identical reference symbols are used to denote identical or comparable components.

Figure 1:
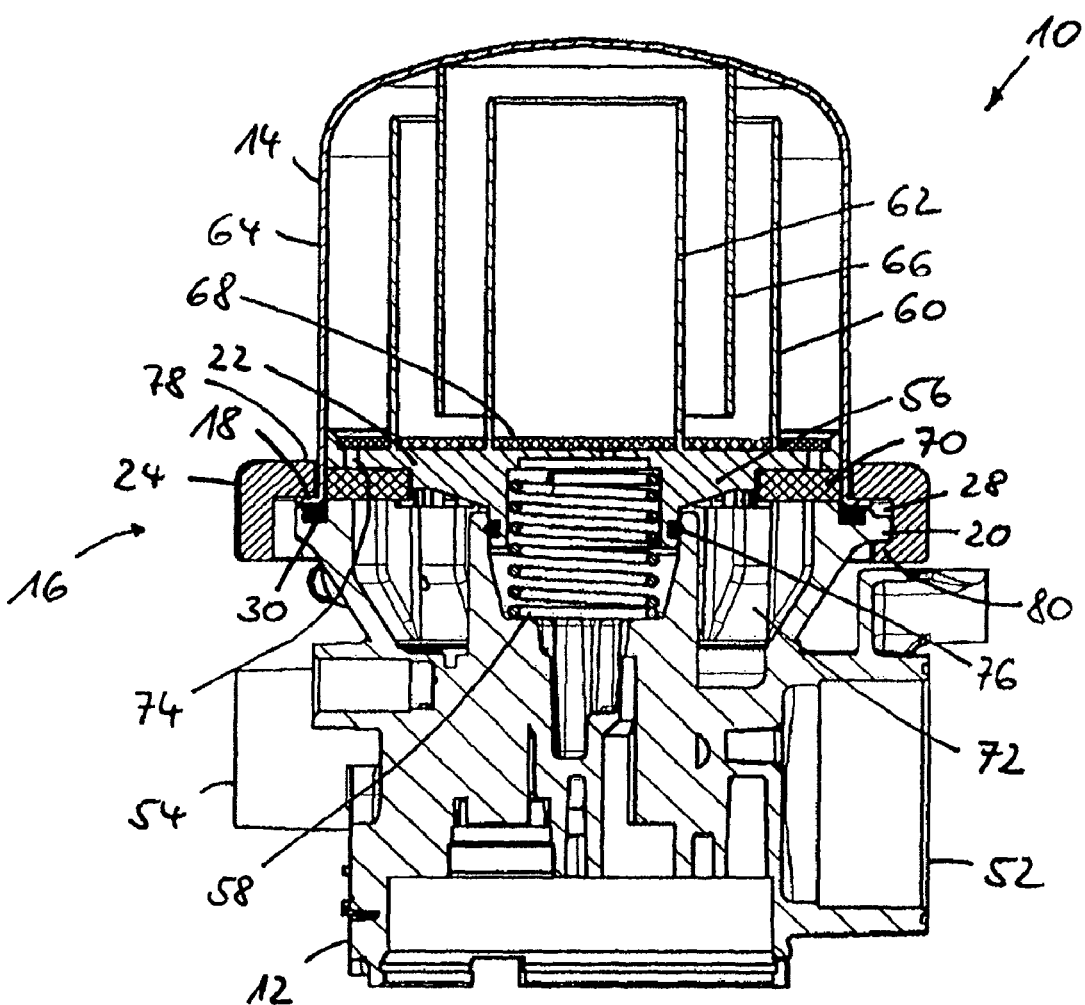
FIG. 1 shows a first embodiment of a compressed air supply device according to an embodiment of the invention in a sectioned illustration.
Figure 2:
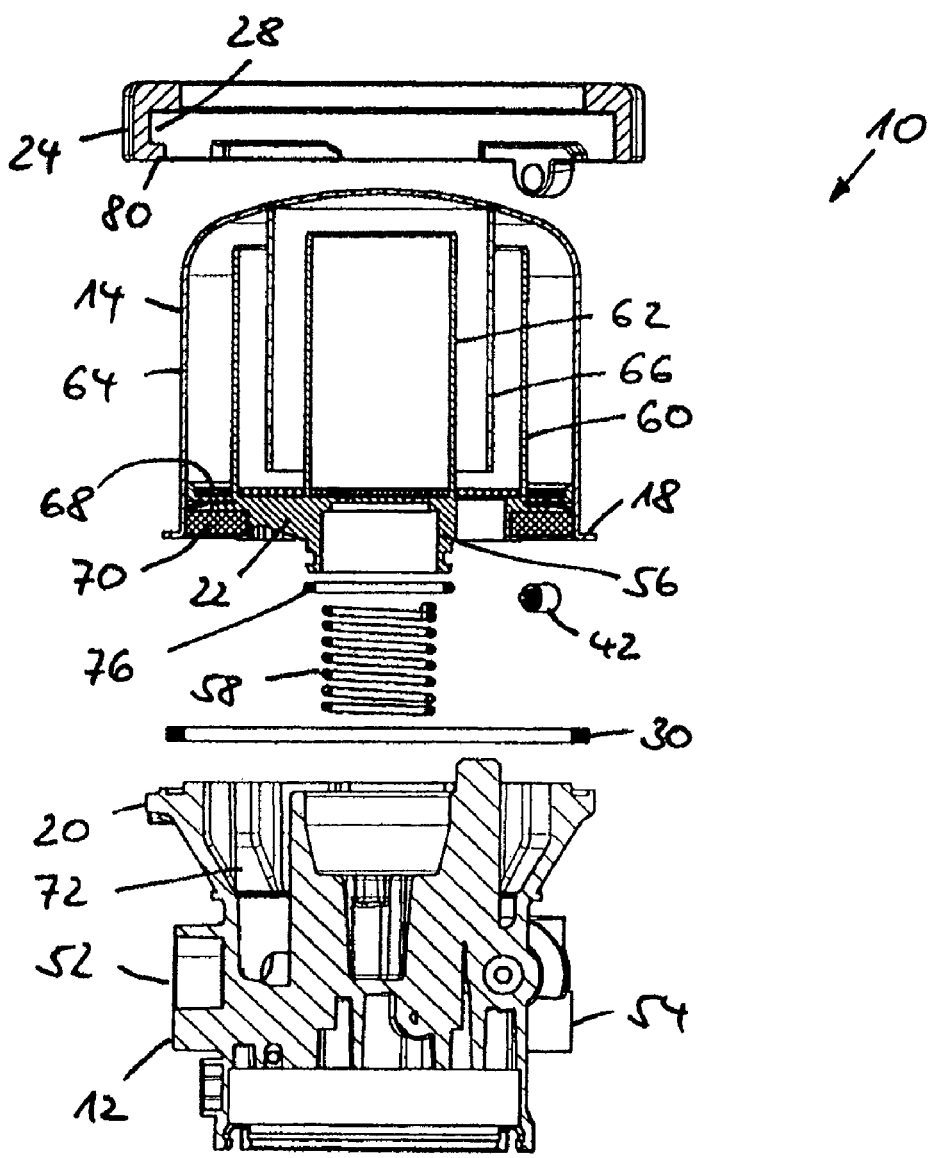
FIG. 2 shows a first embodiment of a compressed air supply device according to an embodiment of the invention in a sectioned exploded illustration.

FIG. 1 shows a first embodiment of a compressed air supply device according to the invention in a sectioned illustration. FIG. 2 shows a first embodiment of a compressed air supply device according to the invention in a sectioned exploded illustration. The compressed air supply device 10 has a valve housing 12 and an air dryer cartridge 14.

The valve housing 12 has an inlet 52 to which a compressor can be connected and via which compressed air which is to be treated can flow in. An outlet 54 for conducting the treated compressed air onward is also provided.

A drying agent box 56 which is preferably composed of plastic is arranged in the air dryer cartridge 14, which drying agent box 56 projects into the valve housing 12 and is supported on the latter via a spring 58. The drying agent box 56 comprises a base 22, an outer tube piece 60 and an inner tube piece 62 which extend into the air dryer cartridge 14. A further tube piece 66, which is fastened to the housing 64 of the air dryer cartridge 14 and which is preferably composed of metal is arranged between the tube pieces 60, 62, which further tube piece 66 is open in the direction of the valve housing 12 while the tube pieces 60, 62 of the drying agent box 56 are open in the opposite direction. The connection of the tube piece 66 to the housing 64 may expediently take place by means of spot welding, with additional sealing being provided, for example by means of hardening material. The tube pieces 60, 62, 66 which are arranged one inside the other in this way and the housing 64 serve to form a labyrinth which is filled entirely with granulate for drying the compressed air which flows through the labyrinth. The tight packing of the drying agent in the air dryer cartridge 14 is provided by the force imparted by the spring 58, which force drives the drying agent box 56 into the air dryer cartridge 14. The space filled by drying agent is at least partially delimited in the direction of the valve housing 12 by nonwoven filter 68, wherein the individual regions, which are delimited by the tube pieces 60, 62, 66, of the filter nonwoven 68 may be composed of identical or different materials. In particular, the outer region of the nonwoven filter 68 between the tube piece 60 and the housing 64 of the air dryer cartridge 14 and the central region of the nonwoven filter 68 within the inner tube piece 62 are designed as dust filters, while the nonwoven region arranged between the outer tube piece 60 and the inner tube piece 62 is designed for absorbing and, when required, releasing foreign substances which can emerge out of the drying agent box 56 via non-return valves (see FIG. 17). A pre-filter 70 is also arranged in the region of the lower delimitation of the air dryer cartridge 14, which pre-filter 70 may optionally have the properties of a coalescence filter. The pre-filter 70 serves in particular for cleaning the compressed air with regard to compressor oil and similar contaminants.

Compressed air which flows into the valve housing 12 via the inlet 52 is distributed via ducts in the valve housing 12 in order to then flow via the duct 72 to the pre-filter 70 and pass through the latter. Subsequently, the compressed air flows through the duct 74 and then through the nonwoven filter 68 into the tightly-packed drying agent. The air flows in the air dryer cartridge as far as beyond the open end of the outer tube piece 60 of the drying agent box 56, and is then deflected in order to flow back in the direction of the valve housing 12 between the outer tube piece 60 and the tube piece 66 which is fastened to the housing 64 of the air dryer. After the compressed air has passed the open end of the tube piece 60, said compressed air is again deflected in order to subsequently flow between the tube piece 66, which is fastened to the housing 64 of the air dryer cartridge 14, and the inner tube piece 62, and beyond the end of said tube piece 62. There, the air is again deflected in order to then flow centrally through the inner tube piece 62 and the nonwoven filter 68 and out of the air dryer cartridge 14 and the drying agent box 56, and back into the valve housing 12. The air is collected in the valve housing 12 via ducts and may then be extracted via the outlet 54.

To enable the air guidance described above, it is necessary for the drying agent box 56 to be sealed off with respect to the valve housing 12 by means of a seal 76 which is designed here as a radially acting seal, in particular as an O-ring. Furthermore, an axially acting seal 30 is provided which seals off a collar 18 of the housing 64 of the air dryer cartridge 14 with respect to the valve housing 12. In order to provide the compression of the seal 30 required for the sealing action, a bayonet connection 16 is provided which holds the valve housing 12 and the air dryer cartridge 14 together. The bayonet connection 16 comprises an outer bayonet ring 24 with inner recesses 28 which are formed in sections and which are formed by projections 80 and a collar 78 which is continuous in the tangential direction. Said inner recesses 28 are suitable for holding collar sections 20 of the valve housing 12 and, with said collar sections 20, imparting an axial force via in each case beveled surfaces by means of a rotation of the outer bayonet ring 24 with respect to the valve housing 12, which axial force presses the collar 18 of the air dryer cartridge 14 against the valve housing 12 via the seal 30. The collar 78, which is continuous in the tangential direction, of the outer bayonet ring 24 therefore interacts with the collar 18, which is continuous in the tangential direction, of the air dryer cartridge 14, while the collar sections 20 of the valve housing 12 interact with the projections 80 of the outer bayonet ring 24 by means of the inclined surfaces thereof, and thereby provide the characteristics of a bayonet connection during a relative rotation. In the exploded illustration of FIG. 2, a securing element is also shown which will be explained in more detail with reference to the following figure.

Figure 3:
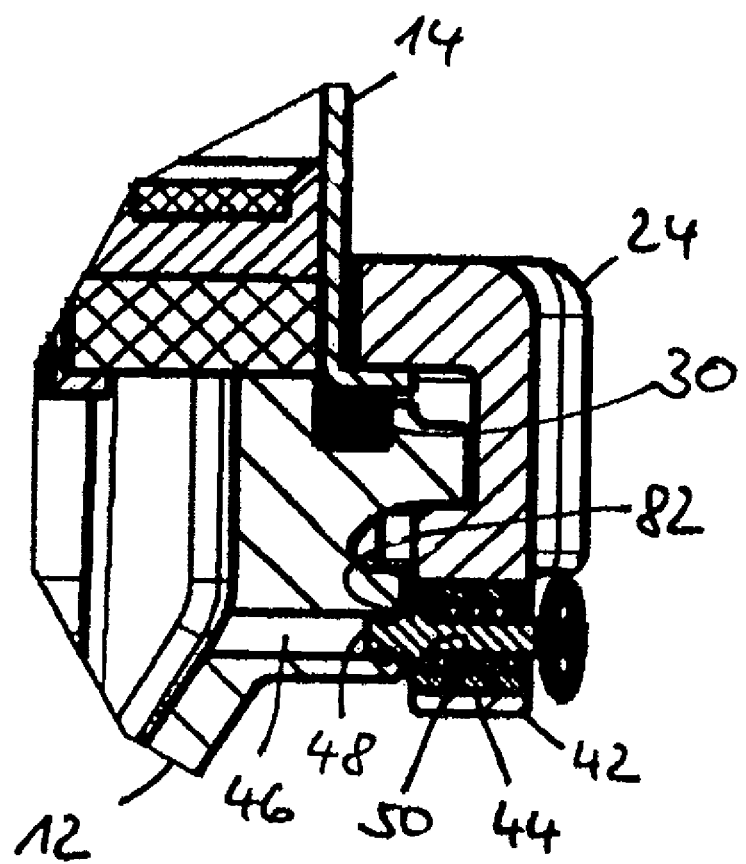
FIG. 3 shows a sectioned view of a part of a compressed air supply device according to an embodiment of the invention with a securing element.

FIG. 3 shows a sectioned view of a part of a compressed air supply device according to the invention with a securing element. The securing element 42 is seated in an opening 44 of the outer bayonet ring 24 and is fixedly connected to the latter there. In the state illustrated in FIG. 3, a lug 48 of the securing element 42 protrudes into an opening 46 of the valve housing, which opening is connected to the compressed air channels in the valve housing 12. The lug 48 of the securing element 42 supports a seal 82 such that, in the illustrated state, an outflow of compressed air is prevented. If the outer bayonet ring 24 is to be rotated with respect to the valve housing 12 in order to open the bayonet connection 16, then it is firstly necessary to pull the securing element 42 outward, out of the opening 46 counter to the force of a spring 50. After the opening 46 is released, the compressed air can then flow out of the system; at the same time, the rotational movement of the outer bayonet ring 24 with respect to the valve housing 12 is enabled. During the closing of the bayonet connection 16, the outer bayonet ring 24 is rotated relative to the valve housing 12 in the closing direction until the lug 48 latches into the opening 46 again and seals the latter off. If the latching-in action is audible, then this simultaneously provides confirmation to the driver that the compressed air supply device 10 has been correctly assembled. Since an opening 46 for the outflow of compressed air is provided only at one peripheral position of the valve housing 12, it must be ensured that the outer bayonet ring 24 can be guided over the collars to be connected to one another only in precisely one position, for example by mechanical guides, in order that the securing element 42 and the opening 46 then also encounter one another during the closing process.

FIG. 4 shows a perspective illustration of an outer bayonet ring. FIG. 5 shows a plan view of an outer bayonet ring. The outer bayonet ring has, on its outer side, a corrugated surface 86 which improves handling during closing and opening. On the inner side of the outer bayonet ring 24, it is possible to see the projecting collar 78, which comes to rest on the collar 18 of the air dryer cartridge 14, and the projections 80 which interact with the sections 20 of the valve housing. It is also possible to see the securing element holder 84. It can be seen in FIG. 4 that the projections 80 increase in thickness from one end region to the other, with a more pronounced run-on bevel also being provided at the thinner end region. The run-on bevel may for example have an inclination of 30°, while the subsequent surface has a gradient of, for example, 1.5°.

Figure 6:
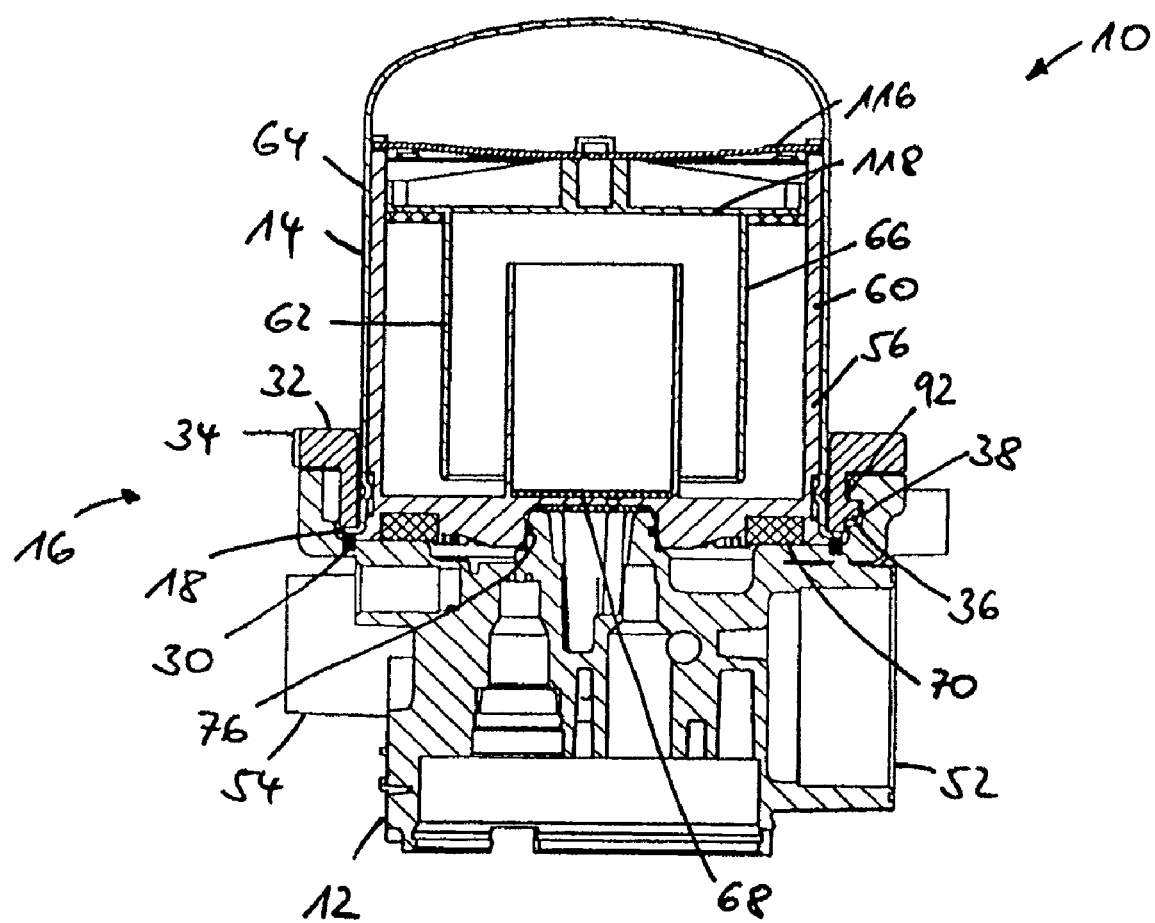
FIG. 6 shows a second embodiment of a compressed air supply device according to an embodiment of the invention, in a sectioned illustration.

FIG. 6 shows a second embodiment of a compressed air supply device according to the invention, in a sectioned illustration. In contrast to the embodiment described above, the bayonet connection 16 which connects the air dryer cartridge 14 to the valve housing 12 comprises an inner bayonet ring 32. The inner bayonet ring 32 is guided over the air dryer cartridge 14 and is rotationally secured with respect to the air dryer cartridge by means of latching lugs 90 on the inner surface of the inner bayonet ring 32 and corresponding recesses 88 on the housing 64 of said air dryer cartridge. The inner bayonet ring 32 has an outwardly extending collar 34 and outwardly extending projections 36 which are offset axially with respect to said collar 34. The projections 36 have bevels which engage into recesses 38 of a part, which is situated partially outside the inner bayonet ring 32, of the valve housing 12 in order to interact with the radially inwardly extending projections 92 which delimit the recesses 38 at one side. For this purpose, the projections 92 likewise have bevels, which provides a non-positive connection between the projections 92 of the valve housing 12 and the projections 36 of the inner bayonet ring 32 by means of a relative rotation of the inner bayonet ring 32 and valve housing 12. As a result of the closure of the bayonet connection 16, an axially acting force is generated which acts via the collar 18 of the air dryer cartridge 14 on a seal 30; said seal interacts at the other side with the valve housing 12. A further seal 76 is designed as a radial seal, that is to say in particular as an O-ring. Said seal 76 seals off the valve housing 12 with respect to the drying agent box 56, which is preferably composed of plastic.

With the system which is constructed and sealed in this way, efficient and effective air drying is again possible by virtue of compressed air flowing in via the inlet 52 of the valve housing 12, being distributed via air ducts in the valve housing 12 and flowing via a pre-filter 70, which is preferably designed as a coalescence filter, into the air dryer cartridge 14 or into the drying agent box 56 which is arranged therein. The drying agent box 56 in turn comprises an outer, upwardly open tube piece 60 and an inner, upwardly open tube piece 62. A further tube piece 66 is arranged between the outer tube piece 60 and the inner tube piece 62, which further tube piece 66 is open in the downward direction and is preferably composed of metal. Said metallic tube piece 66 is held by a compression device 118 which is acted on with force by a spring device 116. The granulate which is provided in the drying agent box and which acts as drying agent is tightly packed by means of said spring force. The air flowing out of the pre-filter 70 flows outside the outer tube piece 60, that is to say between the outer tube piece 60 and the housing 64 of the air dryer cartridge 14, upward through axial ducts (not illustrated) which are arranged between the visible contact regions of the drying agent box 56. To further illustrate said air guidance, reference is made to FIG. 15. The air flows around the open end of the outer tube piece 60, enters into the space, which is free from drying agent, above the compression device 118, and subsequently flows downward between the downwardly open tube piece 66 and the outer tube piece 60 in order to then reverse its flow direction again and flow upward between the inner tube piece 62 and the downwardly open tube piece 66. After another flow reversal, the air to be dried then flows into the inner tube piece 62 in order to then leave the latter in the downward direction through a filter nonwoven 68, which acts as a dust filter, into the valve housing 12. Dried air is then discharged via the outlet 54.

The drying agent box 56 and the free region between the drying agent box 56 and the housing 64 are filled entirely with granulate. The latter may be of uniform design. It may also be particularly expedient to introduce different types of drying agent into the drying agent box 56. For example, the drying agent through which flow passes first may be optimized for more moist air, while the drying agent in the outflow region is optimized for the residual dehumidification of already pre-dried air.

FIG. 7 shows a perspective illustration of an inner bayonet ring. FIG. 8 shows a plan view of an inner bayonet ring. The inner bayonet ring 32 has a corrugated outer surface 86 which improves handling during the rotation of the inner bayonet ring 32. The corrugated outer surface is arranged on the outwardly directed collar 34 of the inner bayonet ring 32. Provided axially offset with respect to the collar 34 are projections 36 which are likewise directed outward and which have the inclination, required for the bayonet function, of the surface 94 which faces toward the collar 34. Said inclination may for example be 1.5°. To facilitate the initial rotational movement during the closing of the bayonet connection, run-on bevels 96 are provided which have a considerably greater inclination, for example 30°. The projections 36 may advantageously have a stop in order to limit the closing movement of the bayonet connection. An axial bore 100 is visible on a shoulder 98 on the collar 34, which axial bore 100 has, to receive the securing element 42 described in detail in connection with FIG. 3. During use, the securing element 42 is fixedly seated in said bore 100 so as to then latch with its lug into a bore, which permits the outflow of compressed air out of the compressed air supply device 10, in the valve housing 12. The advantageous combination of a compressed air discharge device and latching device is thereby also provided in combination with the inner bayonet solution.

The embodiments of the present invention described in connection with FIGS. 1 to 8 contain air dryer cartridges which are designed as open systems. This means that the air dryer cartridges seal off directly against the valve housing by means of a seal, that is to say in particular without an interposed flange.

Figure 10:
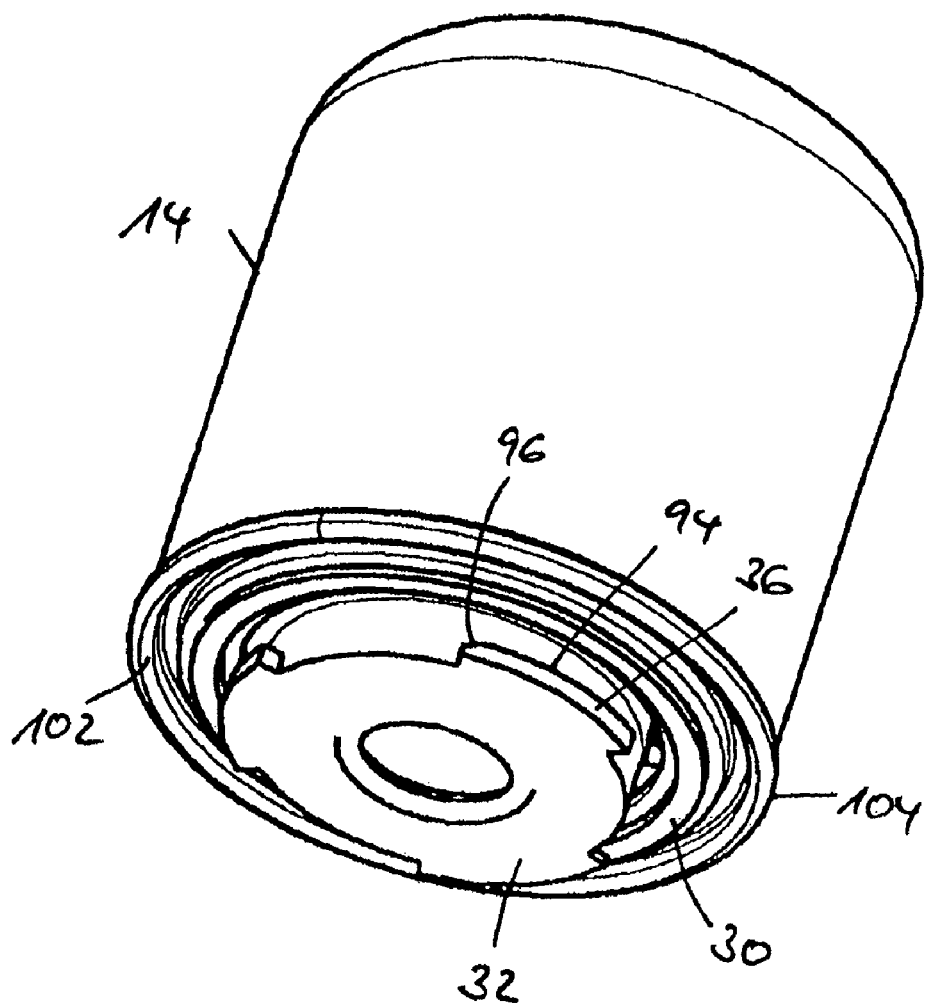
FIG. 10 shows a perspective illustration of an air dryer cartridge with a foot flange and inner bayonet ring according to an embodiment of the invention.
Figure 11:
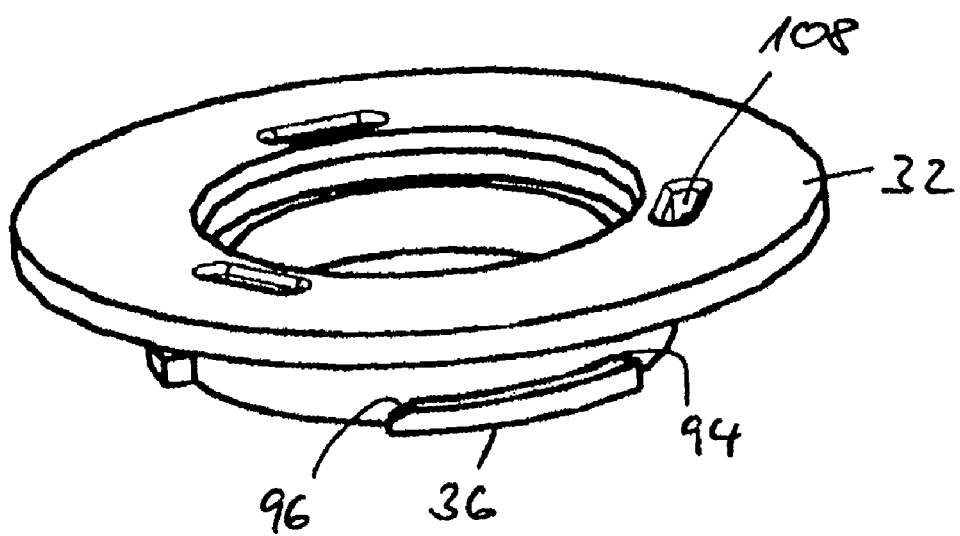
FIG. 11 shows a perspective illustration of an inner bayonet ring with a foot flange function according to an embodiment of the invention.
Figure 12:
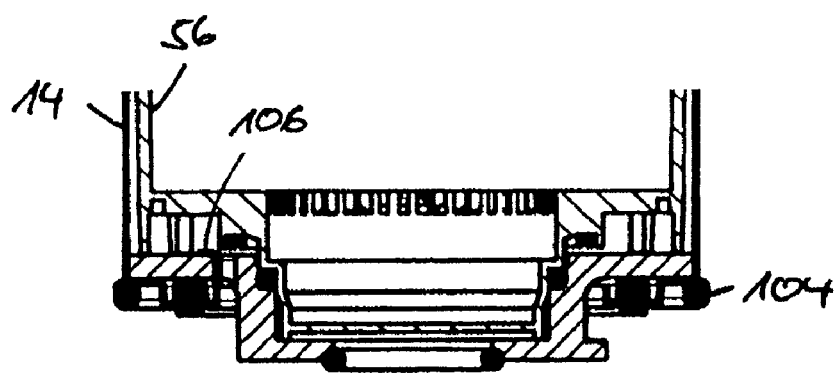
FIG. 12 shows a sectioned view of a part of a compressed air supply device according to an embodiment of the invention for explaining a first form of assembly of a foot flange.
Figure 13:
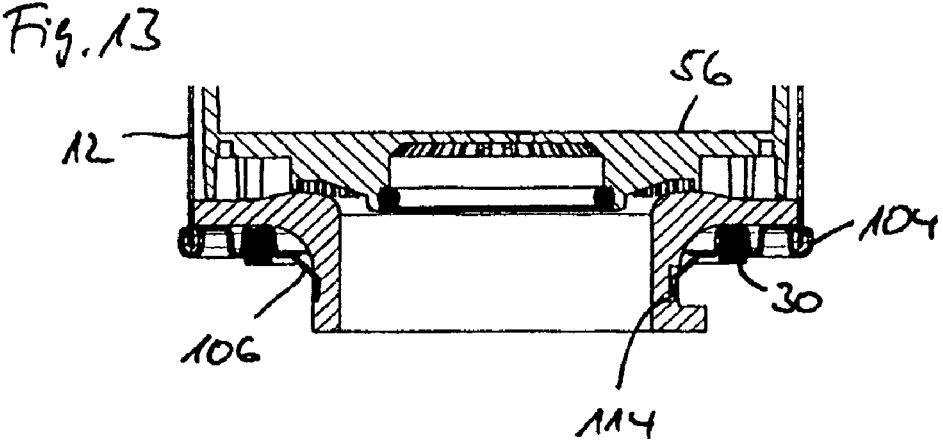
FIG. 13 shows a sectioned view of a part of a compressed air supply device according to an embodiment of the invention for explaining a second form of assembly of a foot flange.

FIG. 9 shows a third embodiment of a compressed air supply device according to the invention, in a sectioned illustration. FIG. 10 shows a perspective illustration of an air dryer cartridge with a foot flange and inner bayonet ring. FIG. 11 shows a perspective illustration of an inner bayonet ring with a foot flange function. FIG. 12 shows a sectioned view of a part of a compressed air supply device according to the invention for explaining a first form of assembly of a foot flange, and FIG. 13 shows a sectioned view of a part of a compressed air supply device according to the invention for explaining a second form of assembly of a foot flange. The system illustrated in said figures has a closed air dryer cartridge 14. Closed air dryer cartridges 14 are those whose housing 64 does not seal off directly against the valve housing 12, but rather a foot flange 40 is provided. The foot flange 40 is combined with an inner bayonet ring 32 which, with regard to its design which provides the bayonet action, is comparable to the inner bayonet ring described in connection with FIGS. 6 to 8. Likewise, the valve housing 12, with regard to the bayonet connection 16, has a similar design to the valve housing 12 described in connection with FIG. 6. The inner bayonet ring 32 is connected by means of a cover 102 to the housing 64 of the air dryer cartridge 14. The connection of the cover 102 to the housing 64 of the air dryer cartridge takes place by means of a flanged edge 104. The foot flange 40 interacts via a seal 30, which bears against the cover 102, with the valve housing 12, with the sealing force acting in the axial direction. A further radially acting seal 144 is provided between the valve housing 12 and the inner bayonet ring 32. A radial seal 110 is likewise provided between the drying agent box 56 and the inner bayonet ring 32. The system which is constructed and sealed in this way permits an inflow of compressed air into the inlet 52, a transfer of the compressed air into the region between the drying agent box 56 and the housing 64 of the air dryer cartridge 14, a deflection of the air into the central region 112, which is filled with drying agent, of the drying agent box 56, and a subsequent outflow of the dried air out of the air dryer cartridge 14 and into the valve housing 12, from which the dried air may then be extracted via the outlet 54. The compression of the drying agent which is present in the drying agent box 56 takes place by means of a spring device which acts on a compression device 118.

According to FIGS. 11 and 12, the connection of the cover 102 to the inner bayonet ring 32 takes place by means of the engagement of lugs 106 into openings 108 which are provided for this purpose in the inner bayonet ring 32.

With regard to the fastening of the cover 102 to the inner bayonet ring 32, FIG. 13 shows a variant. Here, lugs 106 do not engage into openings 108 of the inner bayonet ring 32. In fact, said lugs 106 lie in grooves 114 of the inner bayonet ring 32. Said grooves 114 are arranged on the periphery of the inner bayonet ring, in such a way that they do not interfere with the projections required for the bayonet function.

The drying agent box 56 according to FIG. 9 has a fundamentally different design to the drying agent box 56 described in connection with FIGS. 1, 2 and 6. While the latter form a four-channel labyrinth, the drying agent box 56 according to FIG. 9 has no such labyrinthine design. It should be noted that the closed system according to FIG. 9 may likewise easily be combined with a drying agent box 56 with a labyrinthine design like that which is shown in FIGS. 1, 2 and 6. At the same time, the reverse is true, since the use of labyrinthine drying agent boxes is not strictly necessary for the open systems according to FIGS. 1, 2 and 6.

Figure 14:
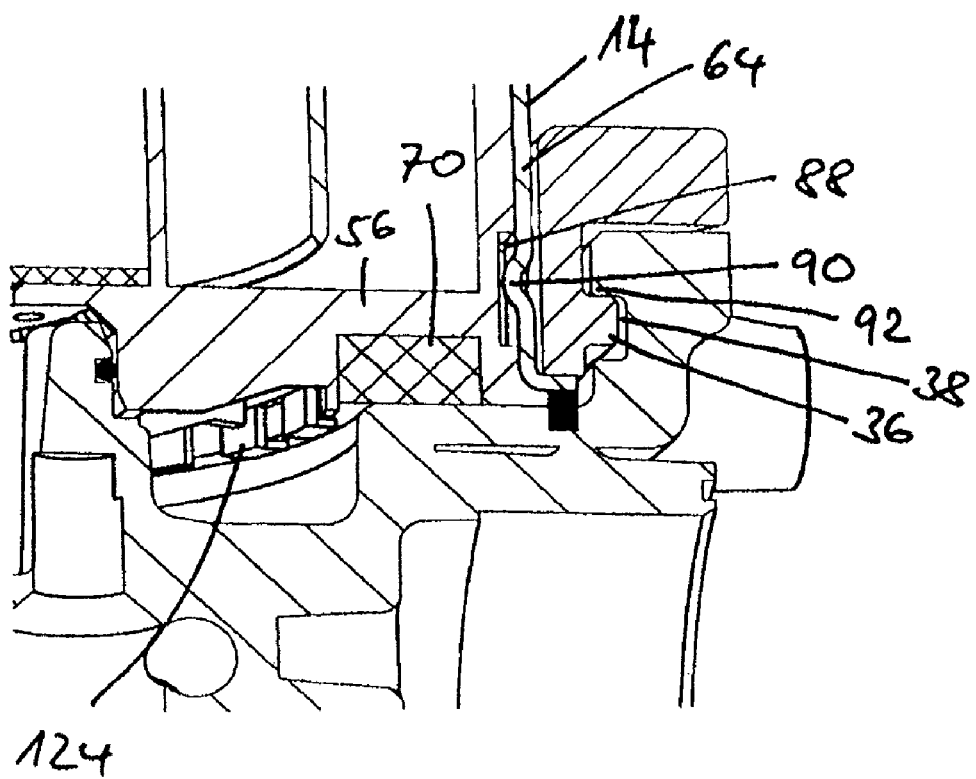
FIG. 14 shows a part of a compressed air supply device according to an embodiment of the invention in a sectioned illustration.

FIG. 14 shows a part of a compressed air supply device according to the invention in a sectioned illustration. In said illustration, it is possible to clearly see the connection between the housing 64 of the air dryer cartridge 14 and the drying agent box 56. A latching lug 90 is arranged in a recess 88. Also shown are holders 124 for holding the pre-filter 70.

Figure 15:
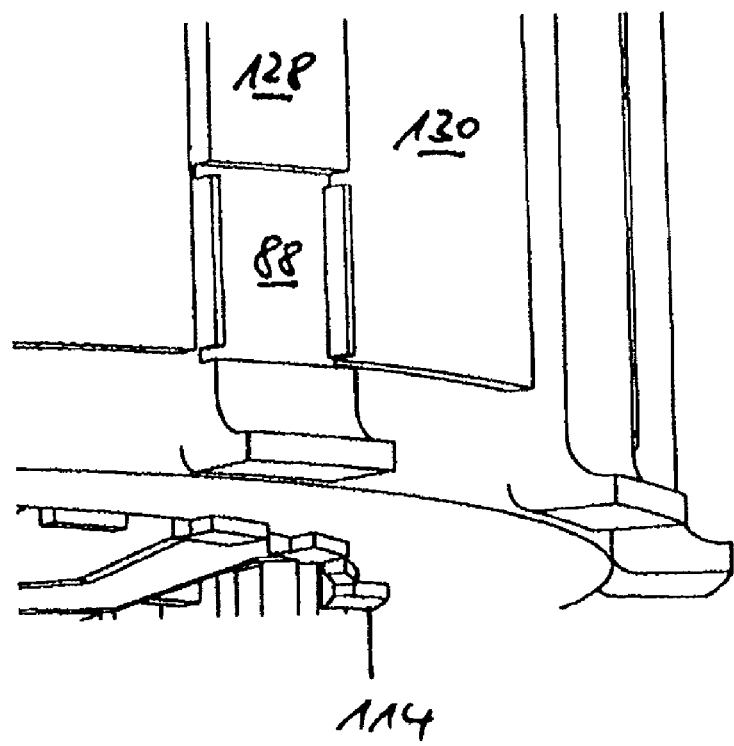
FIG. 15 shows a part of a drying agent box in a perspective illustration.

FIG. 15 shows a part of a drying agent box 56 in a perspective illustration. Here, it is likewise possible to see the recesses 88 and the holders 124. It is also possible to see regions 128 which have an increased diameter in relation to adjacent regions 130. When the drying agent box 56 is inserted into the housing 64 of the air dryer cartridge 14, the regions 128 bear against the housing 64. The regions 130 then serve as ducts in order to conduct the compressed air upward as it flows into the air dryer cartridge 14.

Figure 16:
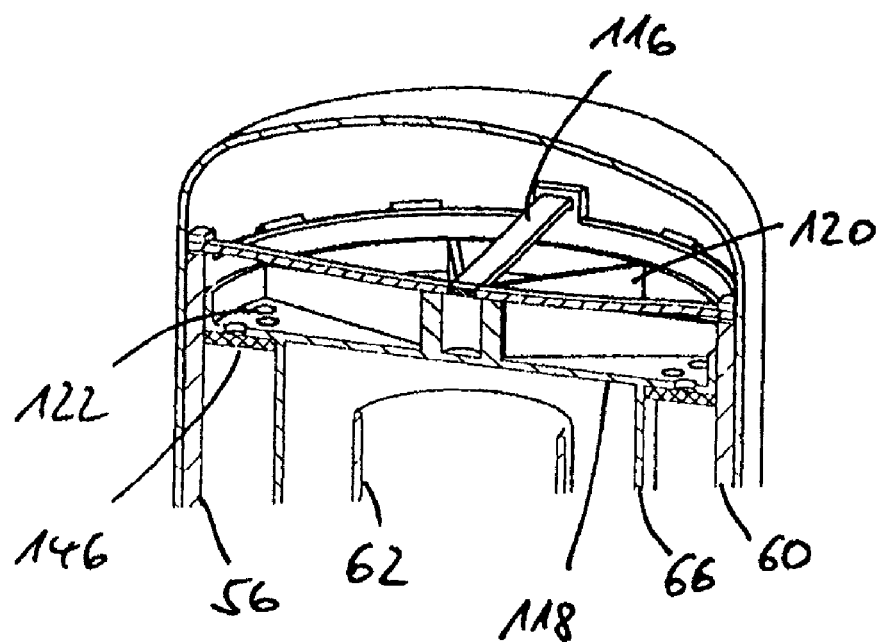
FIG. 16 shows a perspective, sectioned illustration of a part of an air dryer cartridge according to an embodiment of the invention.

FIG. 16 shows a perspective, sectioned illustration of a part of an air dryer cartridge according to the invention. A spring device 116 is fastened to the drying agent box 56, with the connection preferably being realized by injection molding. The spring device 116 is composed of two crossing resilient elements which are connected to one another in the center of the arrangement. There, said resilient elements act downward on a compression device 118 with a force in order to thereby drive the latter into the drying agent box 56. Alternatively, it would for example be possible to provide a centrally arranged spiral spring which is supported on the housing 64 of the air dryer cartridge 14. The compression device 118 is stabilized by means of a multiplicity of webs 120 and has passage holes 122 which to permit a passage of the air present above the compression device 118 into the duct between the outer tube piece 60, which is a constituent part of the drying agent box 56, and the tube piece 66 which is connected to the compression device 118. A filter 146 is arranged in said duct at the inlet side, which filter 146 is traversed by the air as it enters into the duct.

Figure 17:
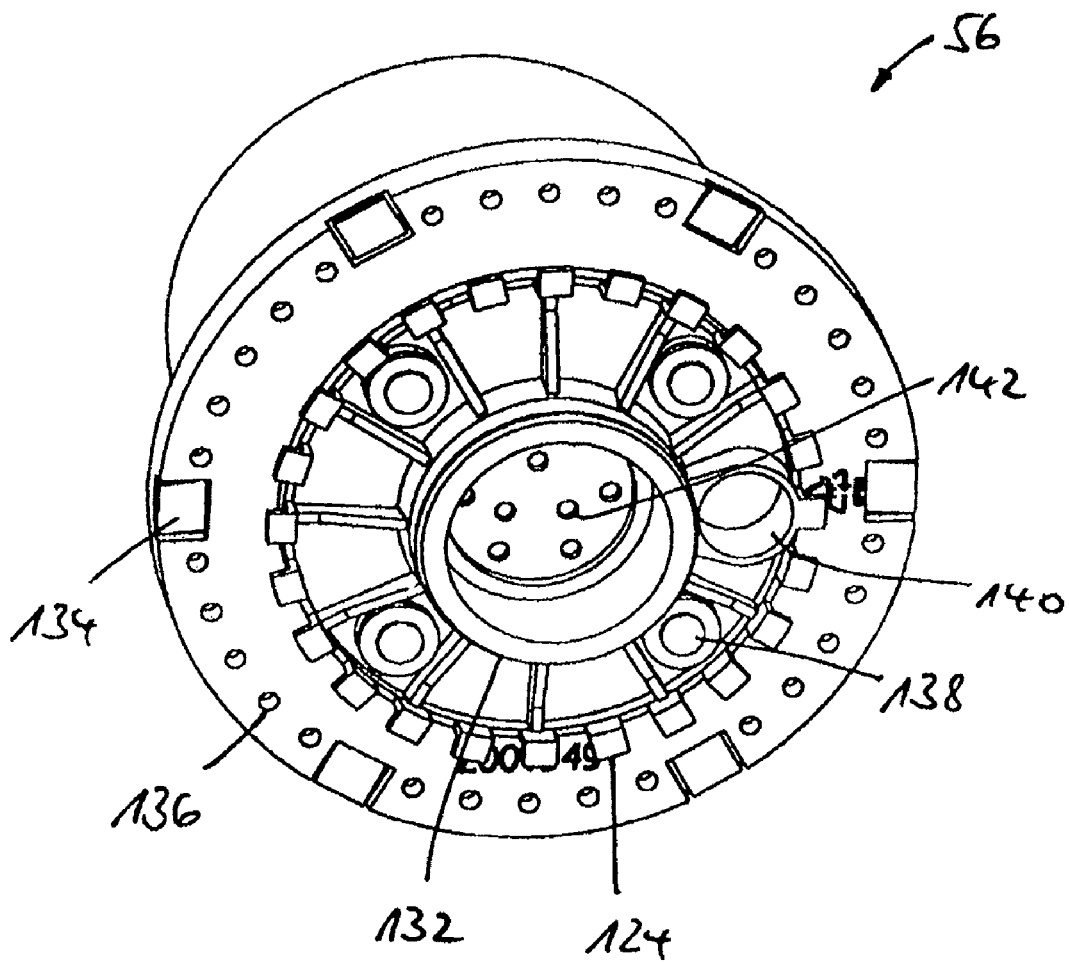
FIG. 17 shows a drying agent box according to an embodiment of the invention in a perspective illustration.

FIG. 17 shows a drying agent box 56 in a perspective illustration. Said drying agent box 56 may for example be used in the in connection with the embodiment of the compressed air supply device 10 according to the invention described on the basis of FIGS. 1 and 2. The spring 58 illustrated in FIG. 1 may project into the central opening 132 of the drying agent box 56 in order to act on the drying agent box 56 with a force in the direction of the air dryer cartridge 14. A plurality of spring lugs 134 are arranged at the periphery of the drying agent box 56, which spring lugs 134 engage in the manner of claws into the housing 64 of the air dryer cartridge 14 and thereby likewise exert an axially upwardly directed force on the drying agent box 56. With a suitable design of the spring lugs 134, it is under some circumstances possible to dispense with the spring 58 which projects into the opening 132, and this facilitates the assembly of the compressed air supply device 10. A multiplicity of openings 136 is provided in the region of the periphery of the drying agent box 56, via which openings 136 the compressed air flows into the drying agent. A multiplicity of openings 142 can be seen within the opening 132, through which openings 142 the compressed air can flow out of the drying agent box 56. Also visible are holders 124 for holding the pre-filter 70. Arranged further inward are non-return valves 138, by which the drying agent box can be flushed. The non-return valves are situated directly below the region which is filled with drying agent, with a nonwoven filter 68 preferably shielding the non-return valves 138 from the drying agent. The drying agent box 56 also has an opening 140. A pin which is connected to the valve housing extends into said opening 140 as the air dryer cartridge 14 is placed onto the valve housing 12. Said pin serves to pre-center the air dryer cartridge 14 relative to the valve housing 12 and to prevent the components from rotating relative to one another. The pin on the valve housing is preferably of such a length that said pin provides the first contact between the valve housing 12 and the air dryer cartridge 14 during the assembly of the air dryer cartridge 14.

The features of the invention disclosed in the above description, in the drawings and in the claims may be essential both individually and also in any desired combination for the realization of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

10 Compressed air supply device
12 Valve housing
14 Air dryer cartridge
16 Bayonet connection
18 Collar
20 Collar section
22 Base
24 Outer bayonet ring
28 Recess
30 Seal
32 Inner bayonet ring
34 Collar
36 Projection
38 Recess
40 Foot flange
42 Securing element
44 Opening
46 Opening
48 Lug
50 Spring
52 Inlet
54 Outlet
56 Drying agent box
58 Spring
60 Outer tube piece
62 Inner tube piece
64 Housing
66 Tube piece
68 Filter nonwoven
70 Pre-filter
72 Duct
74 Duct
76 Seal
78 Collar
80 Projection
82 Seal
84 Securing element holder
86 Corrugated surface
88 Recess
90 Latching lug
92 Projection
94 Surface
96 Run-on bevel
98 Shoulder
100 Bore
102 Cover
104 Flanged edge
106 Lug
108 Opening
110 Radial seal
112 Drying agent region
114 Groove
116 Spring device
118 Compression device
120 Web
122 Passage hole
124 Holder
128 Region
130 Region
132 Opening
134 Spring lug
136 Opening
138 Non-return valve
140 Opening
142 Opening
144 Seal
146 Filter

What is claimed is:

1. A compressed air supply device for a utility vehicle, comprising:
a valve housing; and
an air dryer cartridge,
wherein
the air dryer cartridge is releasably connected to the valve housing,
the valve housing and the air dryer cartridge are connected to one another by a bayonet connection,
the bayonet connection has an inner bayonet ring or an outer bayonet ring which has an opening to receive a securing element in a closed state of the bayonet connection which enters an opening of the valve housing, and
when the securing element is actuated in the valve housing opening, the compressed air supply device is ventilated.

2. The compressed air supply device as claimed in claim 1, wherein
the air dryer cartridge and the valve housing each have, at least in portions, a substantially radially outwardly extending collar,
at least one of the collars has interrupted collar sections,
at least one of the interrupted collar sections has an axial collar thickness which increases in the closing direction of the bayonet connection,
wherein the outer bayonet ring
is guided by at least one of the collars and is releasable from the air dryer cartridge and the valve housing,
has a radially inwardly extending collar and, offset in an axial direction, radially inwardly directed projections having an axial width corresponding to the at least one interrupted sections such that rotation of the outer bayonet ring relative to at least one of the valve housing and air dryer cartridge permits the bayonet connection to be released.

3. The compressed air supply device as claimed in claim 2, wherein
the collar of the valve housing has a plurality of interrupted collar sections which extend in a tangential direction and have an axial collar thickness which increases in the closing direction of the bayonet connection,
recesses which are provided between the interrupted collar sections, and
the collar of the air dryer cartridge extends substantially uniformly around the cartridge periphery and is sealed by a seal between the air dryer cartridge collar and the valve housing when the bayonet connection is closed.

4. The compressed air supply device as claimed in claim 3, wherein
at least one of the interrupted collar sections has a stop for limiting the closing rotation of the bayonet connection.

5. The compressed air supply device as claimed in claim 2, wherein
the outer bayonet ring is rotationally secured with respect to the air dryer cartridge.

6. The compressed air supply device as claimed in claim 1, wherein
the air dryer cartridge has a substantially radially outwardly extending collar which when in a closed state of the bayonet connection, is acted on with a force in the axial direction by the inner bayonet ring which surrounds the air dryer cartridge, the inner bayonet ring has a radially outwardly extending collar and, offset in the axial direction with respect thereto, outwardly directed projections having an axial projection thickness which increases in the closing direction of the bayonet connection, and the inner bayonet ring has a part situated at least partially radially outside an inner bayonet ring of the valve housing, the part having radially outwardly extending recesses whose axial thicknesses are adapted to projections of the inner bayonet ring of the valve housing such that rotation of the inner bayonet ring relative to at least one of the valve housing and air dryer cartridge permits the bayonet connection to be released.

7. The compressed air supply device as claimed in claim 6, wherein at least one of the projections of the inner bayonet ring has a stop for limiting the closing rotation of the bayonet connection.

8. The compressed air supply device as claimed in claim 7, wherein the inner bayonet ring is rotationally secured with respect to the air dryer cartridge.

9. The compressed air supply device as claimed in claim 7, wherein the inner bayonet ring is releasable from the air dryer cartridge.

10. The compressed air supply device as claimed in claim 7, wherein the air dryer cartridge interacts with the valve housing via a seal when the bayonet connection is closed.

11. The compressed air supply device as claimed in claim 7, wherein the inner bayonet ring is fixedly connected to the air dryer cartridge and forms at least a part of a foot flange of the air dryer cartridge.

12. The compressed air supply device as claimed in claim 1, wherein the securing element has a lug which is urged by a spring force into the valve housing opening, the lug being movable counter to the spring force in order to ventilate the compressed air supply device and to enable opening of the bayonet connection.

13. The compressed air supply device as claimed in claim 1, wherein the valve housing has an eccentric pin which projects in the direction of the air dryer cartridge and is arranged to protrude into an opening of a drying agent box arranged in a housing of the air dryer cartridge, and the length of the pin is such that a first contact between the air dryer cartridge and the valve housing during assembly is made by the eccentric pin.

14. A method of assembling a compressed air supply device for a utility vehicle, comprising:

aligning a valve housing adjacent to an air dryer cartridge;

securing the valve housing and the air dryer cartridge to one another by rotation of a bayonet connection having an outer bayonet ring or an inner bayonet ring; and securing the bayonet connection with respect to the valve housing with a securing element that ventilates the compressed air supply device when removed.

15. The method of claim 14, wherein the air dryer cartridge and the valve housing each have, at least in portions, a substantially radially outwardly extending collar, at least one of the collars has interrupted collar sections, at least one of the interrupted collar sections has an axial collar thickness which increases in the closing direction of the bayonet connection, and the outer bayonet ring having a radially inwardly extending collar and, offset in an axial direction, radially inwardly directed projections having an axial width corresponding to the at least one interrupted sections such that rotation of the outer bayonet ring relative to at least one of the valve housing and air dryer cartridge permits the bayonet connection to be released, the method further comprising:

guiding the outer bayonet ring along at least one of the collars into or out of a locked position of the bayonet connection.

16. The method as claimed in claim 15, wherein the collar of the valve housing has a plurality of interrupted collar sections which extend in a tangential direction and have an axial collar thickness which increases in the closing direction of the bayonet connection, recesses which are provided between the interrupted collar sections, and the collar of the air dryer cartridge extends substantially uniformly around the cartridge periphery and is sealed by a seal between the air dryer cartridge collar and the valve housing when the bayonet connection is closed.

17. The method as claimed in claim 16, wherein at least one of the interrupted collar sections has a stop for limiting the closing rotation of the bayonet connection.

* * * * *